(12) United States Patent
Yamada et al.

(10) Patent No.: US 12,341,412 B2
(45) Date of Patent: Jun. 24, 2025

(54) DIRECT-CURRENT POWER SUPPLY, REFRIGERATION CYCLER, AIR CONDITIONER, AND REFRIGERATOR

(71) Applicant: Mitsubishi Electric Corporation, Tokyo (JP)

(72) Inventors: Kazuhiro Yamada, Tokyo (JP); Satoru Ichiki, Tokyo (JP); Masaki Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 18/259,634

(22) PCT Filed: Mar. 19, 2021

(86) PCT No.: PCT/JP2021/011510
§ 371 (c)(1),
(2) Date: Jun. 28, 2023

(87) PCT Pub. No.: WO2022/195882
PCT Pub. Date: Sep. 22, 2022

(65) Prior Publication Data
US 2024/0072631 A1    Feb. 29, 2024

(51) Int. Cl.
*H02M 3/158* (2006.01)
*H02M 1/00* (2006.01)
*H02M 1/084* (2006.01)

(52) U.S. Cl.
CPC ....... *H02M 1/0025* (2021.05); *H02M 1/0006* (2021.05); *H02M 3/1584* (2013.01); *H02M 1/084* (2013.01)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 5,604,385 A    2/1997  David
6,018,203 A    1/2000  David et al.
(Continued)

FOREIGN PATENT DOCUMENTS

JP    2001-506477 A    5/2001
JP    2007-014109 A    1/2007
(Continued)

OTHER PUBLICATIONS

International Search Report of the International Searching Authority mailed May 18, 2021 for the corresponding International Application No. PCT/JP2021/011510 (and English translation).

*Primary Examiner* — Jeffrey A Gblende
(74) *Attorney, Agent, or Firm* — Posz Law Group, PLC

(57) ABSTRACT

A direct-current power supply includes: a plurality of semiconductor devices each of which is a multiphase converter incorporating a plurality of semiconductor switching elements and a drive circuit to drive the plurality of semiconductor switching elements; a plurality of first parasitic inductances, each of which connects a reference potential terminal of the drive circuit and output N terminals of the semiconductor switching elements, in the plurality of semiconductor devices; a smoothing capacitor; and an inverter.

16 Claims, 7 Drawing Sheets

(58) Field of Classification Search
CPC ............... H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0006; H02M 1/0095; H02M 1/08; H02M 1/088; H02M 3/1588; H02M 7/5395; H02M 1/14; H02M 1/0043; H02M 1/0074; H02M 1/0077; H02J 3/46; H02J 3/38

See application file for complete search history.

(56) References Cited

U.S. PATENT DOCUMENTS

| | | | | |
|---|---|---|---|---|
| 8,750,008 | B2* | 6/2014 | Sugiyama | H02M 3/1584 |
| | | | | 363/95 |
| 10,205,405 | B2* | 2/2019 | Cyr | H03K 17/60 |
| 10,447,138 | B2* | 10/2019 | Riva | H02M 3/1588 |
| 2020/0091812 | A1 | 3/2020 | Tsubakidani et al. | |

FOREIGN PATENT DOCUMENTS

| | | |
|---|---|---|
| JP | 2009-253136 A | 10/2009 |
| JP | 2020-048241 A | 3/2020 |
| JP | 2020-156207 A | 9/2020 |
| WO | 98/26489 A1 | 6/1998 |

\* cited by examiner

DIRECT-CURRENT POWER SUPPLY, REFRIGERATION CYCLER, AIR CONDITIONER, AND REFRIGERATOR

CROSS REFERENCE TO RELATED APPLICATION

This application is a U.S. national stage application of PCT/JP2021/011510 filed on Mar. 19, 2021, the contents of which are incorporated herein by reference.

FIELD

The present disclosure relates to a direct-current power supply including multiphase converters, a refrigeration cycler, an air conditioner, and a refrigerator.

BACKGROUND

Conventionally, various techniques have been proposed for a multiphase converter including a plurality of semiconductor switching elements. Patent Literature 1 proposes a multiphase converter capable of suppressing the occurrence of a gate overvoltage of semiconductor switching elements due to parasitic inductance.

CITATION LIST

Patent Literature

Patent Literature 1: Japanese Patent Application Laid-open No. 2020-48241

SUMMARY

Technical Problem

However, in the multiphase converter, in addition to the problem of the gate overvoltage, there is a problem that a reference potential of a drive circuit is not stable due to parasitic inductance of a wiring line between output N terminals of semiconductor switching elements and the reference potential terminal of the drive circuit that drives the plurality of semiconductor switching elements. The reference potential of the drive circuit is not stable and hence, there is a concern that a malfunction occurs in the semiconductor switching elements.

The present disclosure has been made in view of the above, and an object of the present disclosure is to obtain a direct-current power supply in which a reference potential of a drive circuit is stable.

Solution to Problem

To solve the above problems and achieve the object, a direct-current power supply according to the present disclosure includes: a plurality of semiconductor devices each of which is a multiphase converter incorporating a plurality of semiconductor switching elements and a drive circuit configured to drive the plurality of semiconductor switching elements; a plurality of first parasitic inductances, each of which connects a reference potential terminal of the drive circuit and an output N terminal of the semiconductor switching elements, in the plurality of semiconductor devices; a smoothing capacitor; and an inverter.

Advantageous Effects of Invention

According to the present disclosure, it is possible to obtain a direct-current power supply in which a reference potential of a drive circuit is stable.

DESCRIPTION OF EMBODIMENTS

Hereinafter, a direct-current power supply, a refrigeration cycler, an air conditioner, and a refrigerator according to embodiments will be described in detail with reference to the drawings.

First, before describing a direct-current power supply according to the present disclosure, a first relevant semiconductor device included in the direct-current power supply will be described.

Figure 1:
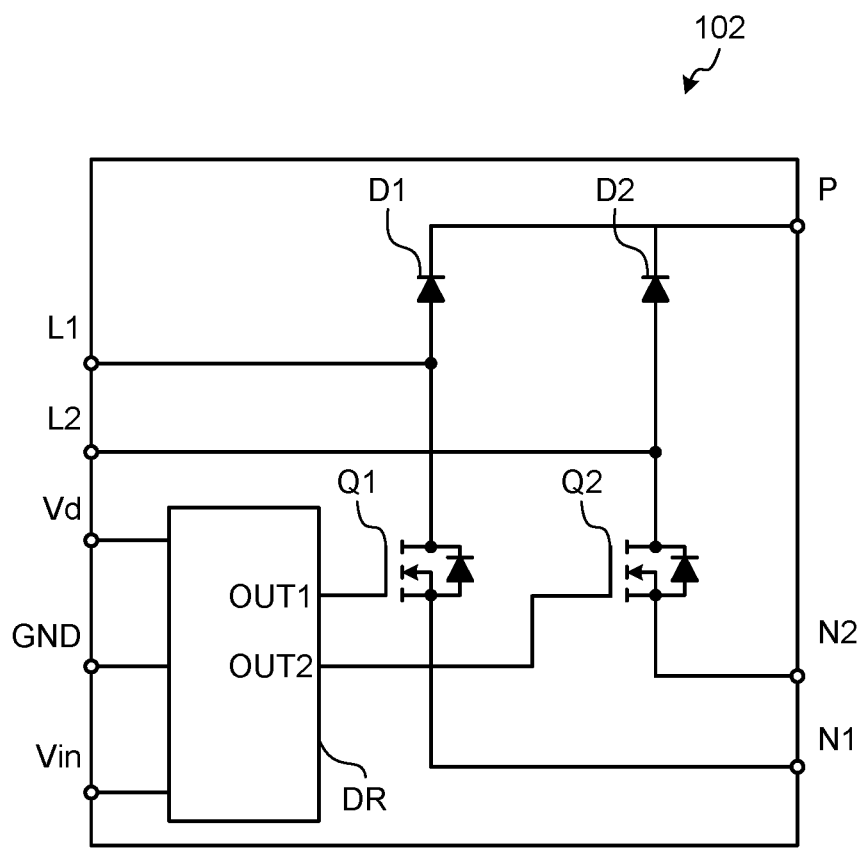
FIG. 1 is a circuit diagram illustrating a configuration of a first relevant semiconductor device.

FIG. 1 is a circuit diagram illustrating a configuration of a first relevant semiconductor device. A first relevant semiconductor device 102 is a multiphase converter including a plurality of semiconductor switching elements Q1 and Q2. The first relevant semiconductor device 102 includes terminals L1 and L2 connected to reactors. The first relevant semiconductor device 102 generates a desired direct-current voltage and outputs the voltage from an output P terminal P and output N terminals N1 and N2 by controlling an alternating-current signal input to the terminals L1 and L2, on the basis of an input signal input to a control signal terminal Vin.

The first relevant semiconductor device 102 includes the plurality of semiconductor switching elements Q1 and Q2, diodes D1 and D2, and a drive circuit DR.

The semiconductor switching elements Q1 and Q2 constitute lower arms of the multiphase converter. The semiconductor switching elements Q1 and Q2 correspond to the respective phases of the multiphase converter. For example, metal-oxide-semiconductor field-effect transistors (MOSFETs) are used as the semiconductor switching elements Q1 and Q2. Note that the number of semiconductor switching elements corresponds to the number of phases of the multiphase converter. FIG. 1 exemplifies a two-phase multiphase converter including two semiconductor switching elements. However, a three or more-phase multiphase converter including three or more semiconductor switching elements may be used.

A drain of the semiconductor switching element Q1 and a drain of the semiconductor switching element Q2 are connected to the terminals L1 and L2, respectively. A source of the semiconductor switching element Q1 and a source of the semiconductor switching element Q2 are connected to the output N terminals N1 and N2, respectively.

Output terminals OUT1 and OUT2 of the drive circuit DR are connected to a gate of the semiconductor switching element Q1 and a gate of the semiconductor switching element Q2, respectively. The drive circuit DR can drive the semiconductor switching elements Q1 and Q2 to make the semiconductor switching elements Q1 and Q2 be turned on and off on the basis of an input signal input to the control signal terminal Vin. The drive circuit DR is supplied with a power supply Vd for driving the semiconductor switching elements Q1 and Q2. For example, a high voltage integrated circuit (HVIC) or a low voltage integrated circuit (LVIC) is used as the drive circuit DR.

The diodes D1 and D2 constitute upper arms of the multiphase converter. The diode D1 has an anode connected to the terminal L1 and the drain of the semiconductor switching element Q1. The diode D1 has a cathode connected to the output P terminal P. The diode D2 has an anode connected to the terminal L2 and the drain of the semiconductor switching element Q2. The diode D2 has a cathode connected to the output P terminal P.

First Embodiment

Figure 2:
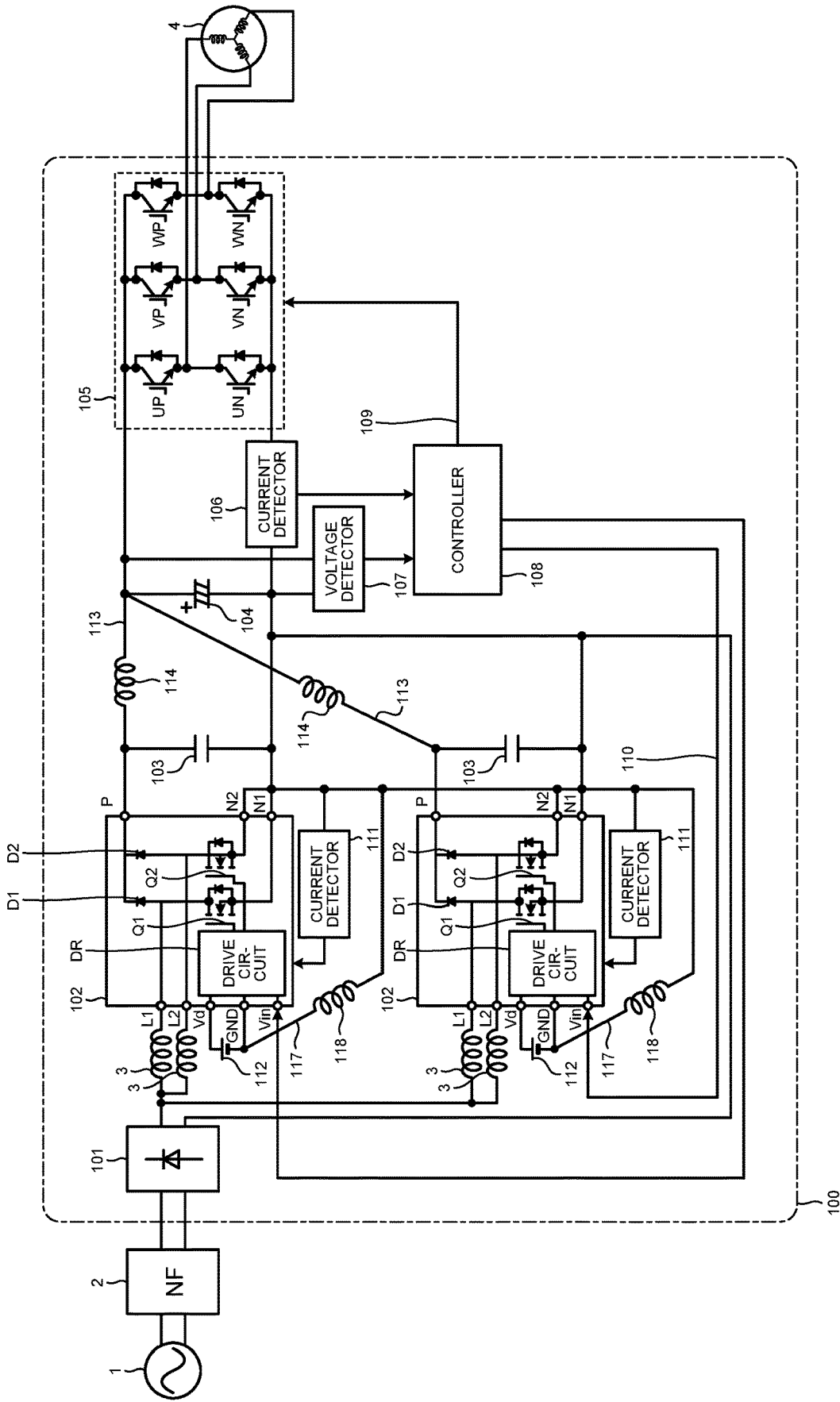
FIG. 2 is a diagram illustrating a configuration of a direct-current power supply according to a first embodiment.

FIG. 2 is a diagram illustrating a configuration of a direct-current power supply according to the first embodiment. A direct-current power supply 100 is connected to an alternating-current power supply 1, a noise filter 2, and a load 4. The direct-current power supply 100 includes: reactors 3; a rectifier circuit 101; two first relevant semiconductor devices 102; high-frequency capacitors 103; a smoothing capacitor 104; an inverter 105; current detectors 106 and 111; a voltage detector 107; a controller 108; and drive circuit power supplies 112.

The reactor 3 is inserted between the rectifier circuit 101 and each of the terminals L1 and L2 of the two first relevant semiconductor devices 102.

The high-frequency capacitor 103 is connected between the output P terminal P and the output N terminals N1 and N2 of each of the two first relevant semiconductor devices 102. The high-frequency capacitor 103 suppresses a surge voltage between the output P terminal P and the output N terminals N1 and N2. The number of first relevant semiconductor devices 102 is not limited to two, and may be three or more depending on the number of phases of the multiphase converter. That is, if the first relevant semiconductor device 102 is a three-phase multiphase converter, the direct-current power supply 100 may include three first relevant semiconductor devices 102.

The output P terminal P of each of the two first relevant semiconductor devices 102 is connected to a wiring line 113, a second parasitic inductance 114, and the smoothing capacitor 104. The smoothing capacitor 104 has a cathode connected to the output N terminals N1 and N2 of each of the two first relevant semiconductor devices 102.

In each of the first relevant semiconductor devices 102, the output N terminals N1 and N2 and a reference potential terminal GND of the drive circuit DR are connected to each other through a wiring line 117 and a first parasitic inductance 118.

The drive circuit power supplies 112 are provided as power supplies for the drive circuits DR of the plurality of first relevant semiconductor devices 102. Each drive circuit power supply 112 is connected between the power supply Vd and the reference potential terminal GND of each of the two first relevant semiconductor devices 102.

The current detectors 106 and 111 are current transformers, shunt resistors, or the like. The current detectors 106 and 111 each convert a detected current value into a voltage within a range that the first relevant semiconductor device 102 and the controller 108 can handle, and output the converted voltage. The current detectors 106 and 111 are realized by amplifiers or the like.

The voltage detector 107 detects a voltage across the smoothing capacitor 104, converts the voltage into a voltage within a range that the controller 108 can handle, and outputs the converted voltage. The voltage detector 107 is realized by an amplifier or the like. The voltage across the smoothing capacitor 104 is a direct-current voltage.

The controller 108 outputs multiphase converter drive signals 110 for driving the two first relevant semiconductor devices 102. The controller 108 outputs an inverter drive signal 109 for driving the inverter 105. The controller 108 is realized by a microcomputer or the like.

The inverter 105 includes semiconductor switching elements UP, UN, VP, VN, WP, and WN, and a drive circuit (not illustrated) for driving the semiconductor switching elements UP, UN, VP, VN, WP, and WN. For example, insulated gate bipolar transistors (IGBTs) are used as the semiconductor switching elements UP, UN, VP, VN, WP, and WN. An HVIC or an LVIC is used as the drive circuit. The inverter 105 is connected to the load 4.

Figure 3:
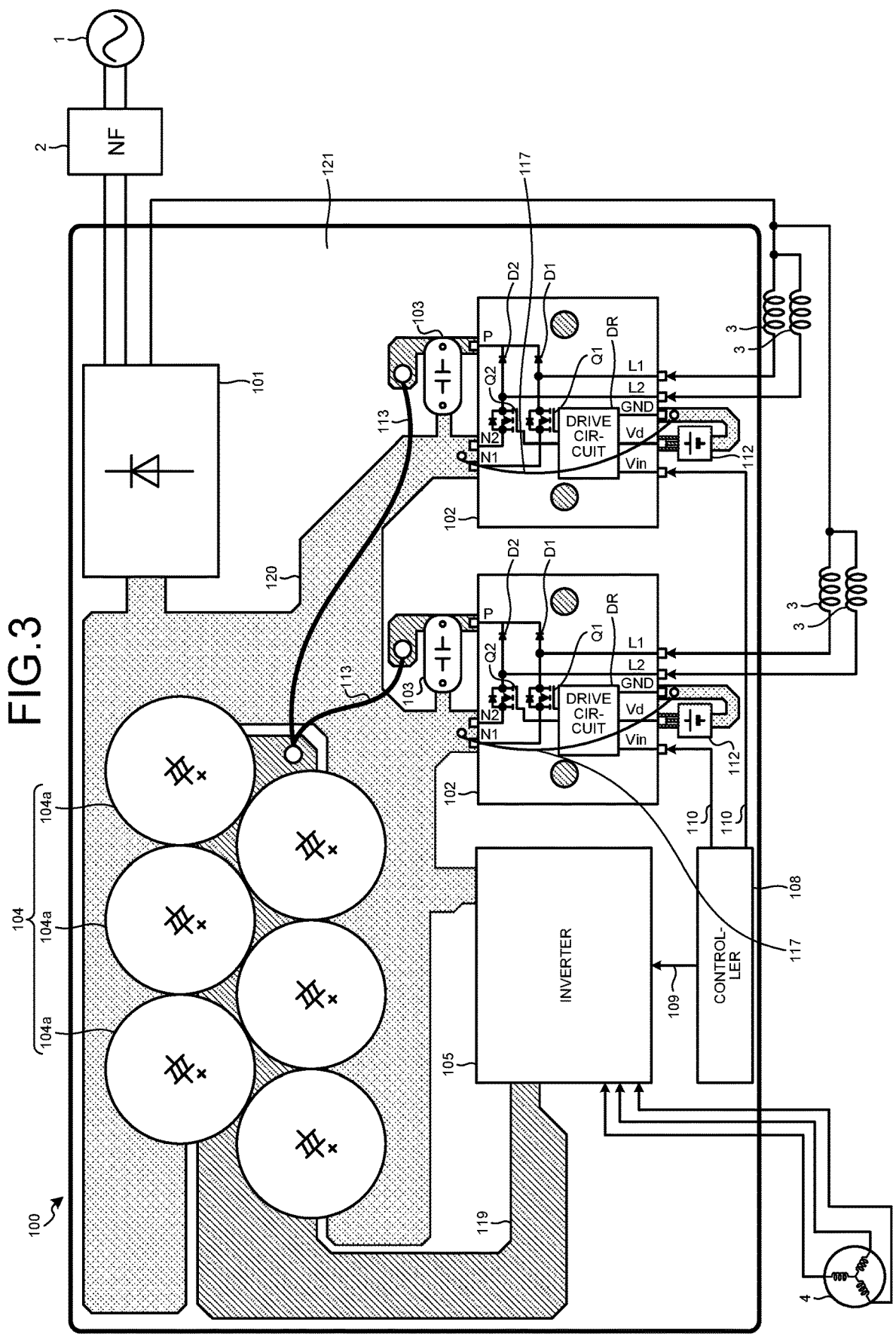
FIG. 3 is a circuit diagram illustrating a configuration of substrate mounting of the direct-current power supply in the first embodiment.

FIG. 3 is a circuit diagram illustrating a configuration of substrate mounting of the direct-current power supply in the first embodiment. The smoothing capacitor 104 includes a plurality of smoothing capacitor cells 104a. Anodes and cathodes of the plurality of smoothing capacitor cells 104a are also simply referred to as an anode and a cathode of the smoothing capacitor 104.

In the substrate mounting, a P-side bus 119 and an N-side bus 120 are provided on a substrate 121. The P-side bus 119 connects the anode of the smoothing capacitor 104 and the inverter 105. The N-side bus 120 connects the cathode of the smoothing capacitor 104 and the inverter 105. The P-side bus 119 and the N-side bus 120 are pattern wiring lines formed on the substrate 121.

In each of the two first relevant semiconductor devices 102, the output N terminals N1 and N2 and the reference potential terminal GND of the drive circuit DR are connected to each other through the wiring line 117 over a short distance. In a case where a pattern wiring line that connects the output N terminals N1 and N2 and the reference potential terminal GND of the drive circuit DR is formed on the substrate 121 with respect to each of the two first relevant semiconductor devices 102, it is necessary to form each pattern wiring line while avoiding other pattern wiring lines. In a case where a jumper line is used as the wiring line 117, it is not necessary to avoid other pattern wiring lines. Accordingly, connection with a shorter wiring length is realized as compared with the case where the output N terminals N1 and N2 and the reference potential terminal GND of the drive circuit DR are connected to each other through the pattern wiring line formed on the substrate 121. The first parasitic inductance 118 illustrated in FIG. 2 is generated by the wiring line 117. The wiring line 117 is a first jumper line. Note that the use of the pattern wiring lines formed on the substrate 121 as the wiring lines 117 is not excluded.

The output P terminal P of each of the two first relevant semiconductor devices 102 and the P-side bus 119 are connected to each other through the wiring line 113 over a short distance. In a case where a pattern wiring line that connects the output P terminal P and the P-side bus 119 is formed on the substrate 121 with respect to each of the two first relevant semiconductor devices 102, it is necessary to form each pattern wiring line while avoiding other pattern wiring lines. In a case where a jumper line is used as the wiring line 113, it is not necessary to avoid other pattern wiring lines. Accordingly, connection with a shorter wiring length is realized as compared with the case where the output P terminal P and the P-side bus 119 are connected to each other through the pattern wiring line formed on the substrate 121. The second parasitic inductance 114 illustrated in FIG. 2 is generated by the wiring line 113. The wiring line 113 is a second jumper line. Note that the use of the pattern wiring lines formed on the substrate 121 as the wiring lines 113 is not excluded.

Figure 4:
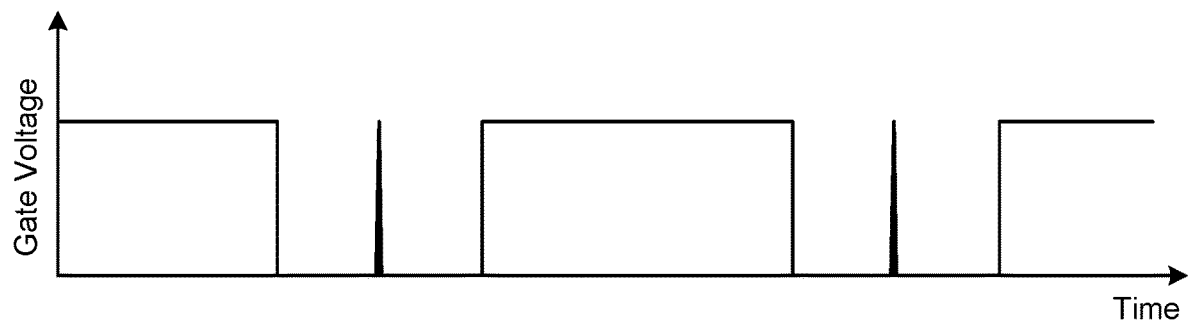
FIG. 4 is a diagram illustrating an example of a malfunction of a drive circuit in the first embodiment.

FIG. 4 is a diagram illustrating an example of a malfunction of the drive circuit in the first embodiment. For example, in a case where the semiconductor switching elements Q1 of the plurality of first relevant semiconductor devices 102 are operated, the reference potential of the drive circuit DR is stabilized by reducing the change in drain current (di/dt) and the first parasitic inductance 118 of the wiring line 117. As a result, the occurrence of the malfunction illustrated in FIG. 4 can be suppressed.

In the first embodiment, the output N terminals N1 and N2 and the reference potential terminal GND of the drive circuit DR are connected to each other in each of the two first relevant semiconductor devices 102. Therefore, the reference potential of the drive circuit DR is stabilized. Furthermore, in each of the two first relevant semiconductor devices 102, the output N terminals N1 and N2 and the reference potential terminal GND of the drive circuit DR are connected to each other by using the wiring line 117 over a short distance. Therefore, the first parasitic inductance 118 is reduced, the reference potential is further stabilized, and the occurrence of the malfunction of the drive circuit DR can be suppressed.

Moreover, in the first embodiment, the output P terminal P of each of the two first relevant semiconductor devices 102 and the P-side bus 119 are connected to each other by using the wiring line 113 over a short distance. Therefore, the second parasitic inductance 114 is reduced, and the occurrence of a surge voltage can be suppressed. As a result, it is possible to suppress damage to the semiconductor switching elements Q1 and Q2 due to the surge voltage.

Second Embodiment

Figure 5:
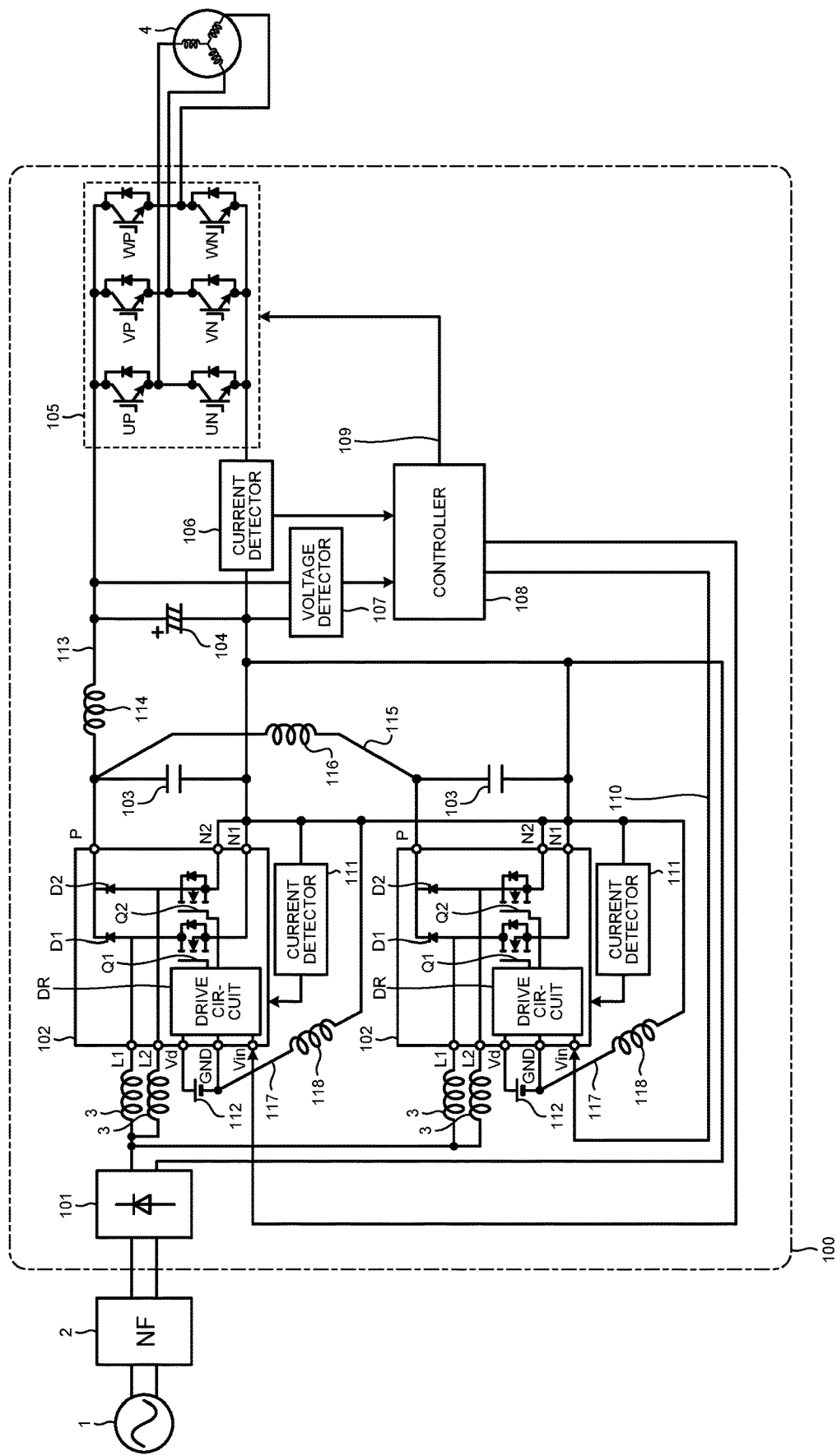
FIG. 5 is a diagram illustrating a configuration of a direct-current power supply according to a second embodiment.
Figure 6:
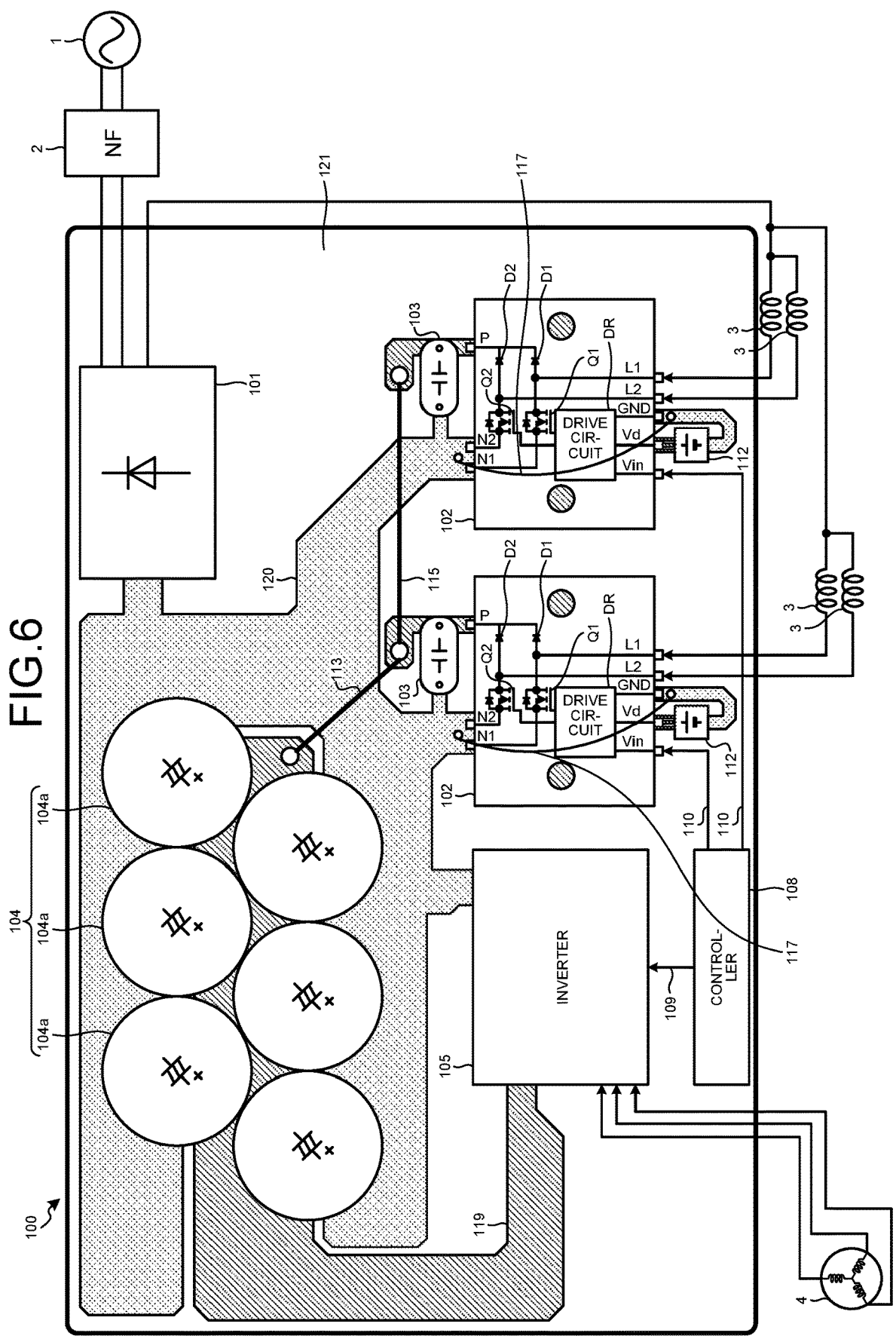
FIG. 6 is a diagram illustrating a configuration of substrate mounting of the direct-current power supply in the second embodiment.

FIG. 5 is a diagram illustrating a configuration of a direct-current power supply according to the second embodiment. FIG. 6 is a circuit diagram illustrating a configuration of substrate mounting of the direct-current power supply in the second embodiment. In the second embodiment, the output P terminals P of the two first relevant semiconductor devices 102 are connected to each other through a wiring line 115.

Moreover, with respect to one first relevant semiconductor device 102 that is closer to the P-side bus 119 out of the two first relevant semiconductor devices 102, the output P terminal P and the P-side bus 119 are connected to each other through the wiring line 113. Jumper lines are used as the wiring line 113 and the wiring line 115. In the second embodiment, the wiring line 115 is a third jumper line. Moreover, the wiring line 113 is a fourth jumper line. A third parasitic inductance 116 is generated by the wiring line 115. A second parasitic inductance 114 is generated by the wiring line 113. The wiring length of the wiring line connecting the P-side bus 119 and the output P terminal P can be shortened by using the wiring line 113 and the wiring line 115 as in the second embodiment, as compared with the case of using two wiring lines 113 as described in the first embodiment. As a result, the second parasitic inductance 114 and the third parasitic inductance 116 are further reduced, and the occurrence of a surge voltage can be suppressed.

Note that also in a case where the direct-current power supply 100 includes three or more first relevant semiconductor devices 102, it is sufficient for the output P terminals P of the adjacent first relevant semiconductor devices 102 to be connected to each other through the wiring line 115. Moreover, the use of the pattern wiring lines formed on the substrate 121 as the wiring line 113 and the wiring line 115 is not excluded.

Figure 7:
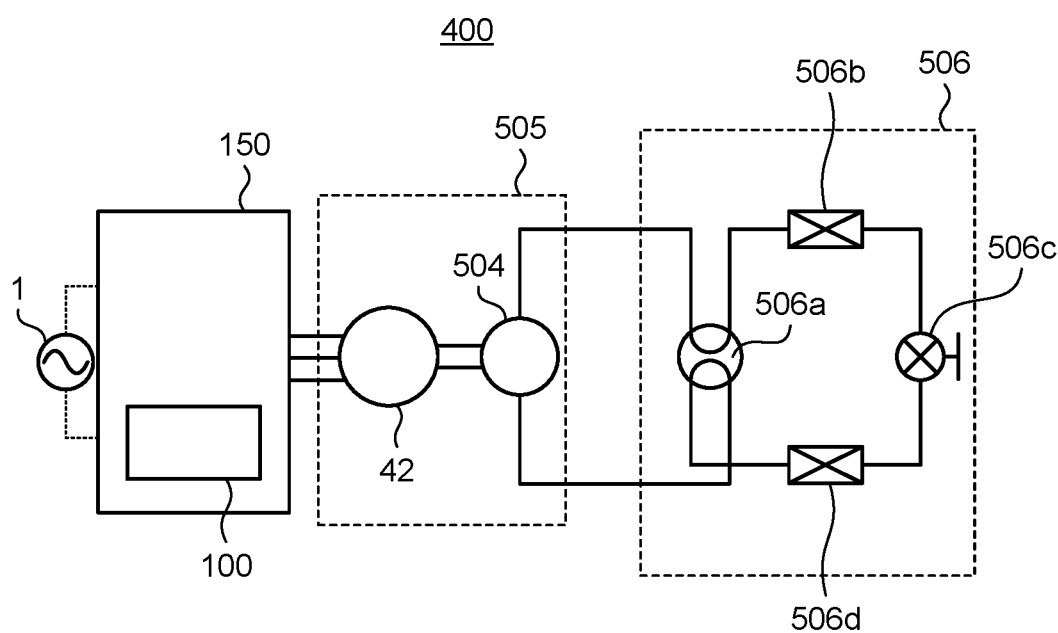
FIG. 7 is a diagram illustrating a configuration of an air conditioner including the direct-current power supply according to either the first or second embodiment.

Here, an application example of the direct-current power supply 100 described in the first and second embodiments will be described. FIG. 7 is a diagram illustrating a configuration of an air conditioner including the direct-current power supply according to either the first or second embodiment.

The direct-current power supply 100 can be applied to a refrigeration cycler such as a refrigerator or an air conditioner 400. Here, an example will be described in which the direct-current power supply 100 is applied to the air conditioner 400 as an example of a refrigeration cycler. The air conditioner 400 includes the alternating-current power supply 1, a motor drive device 150, a compressor 505, and a refrigeration cycle unit 506.

The alternating-current power supply 1 is connected to the motor drive device 150, the motor drive device 150 is connected to the compressor 505, and the compressor 505 is connected to the refrigeration cycle unit 506. The motor drive device 150 includes the direct-current power supply 100 and an inverter not illustrated. The direct-current power supply 100 is connected to the inverter, the inverter is connected to a motor 42 of the compressor 505.

The motor drive device 150 has an output side connected to the motor 42, and the motor 42 is coupled to a compression element 504. The compressor 505 includes the motor 42 and the compression element 504. The refrigeration cycle unit 506 includes a four-way valve 506a, an indoor heat exchanger 506b, an expansion valve 506c, and an outdoor heat exchanger 506d.

A flow path of a refrigerant that circulates inside the air conditioner 400 is formed such that the refrigerant flows from the compression element 504, passes through the four-way valve 506a, the indoor heat exchanger 506b, the expansion valve 506c, the outdoor heat exchanger 506d, and again passes through the four-way valve 506a, and then returns to the compression element 504. The motor drive device 150 is supplied with alternating-current power from the alternating-current power supply 1, and rotates the motor 42. The compression element 504 executes a compression operation of the refrigerant by the rotation of the motor 42, and can circulate the refrigerant inside the refrigeration cycle unit 506.

The above configurations illustrated in the embodiments are examples, and can be combined with other known techniques, embodiments can be combined with each other, and the above configurations can be partly omitted or changed without departing from the gist.

REFERENCE SIGNS LIST 1 alternating-current power supply; 2 noise filter; 3 reactor; 4 load; 100 direct-current power supply; 101 rectifier circuit; 102 first relevant semiconductor device; 103 high-frequency capacitor; 104 smoothing capacitor; 104a smoothing capacitor cell; 105 inverter; 106, 111 current detector; 107 voltage detector; 108 controller; 109 inverter drive signal; 110 multiphase converter drive signal; 112 drive circuit power supply; 113, 115, 117 wiring line; 114 second parasitic inductance; 116 third parasitic inductance; 118 first parasitic inductance; 119 P-side bus; 120 N-side bus; 121 substrate; D1, D2 diode; DR drive circuit; GND reference potential terminal; L1, L2 terminal; N1, N2 output N terminal; OUT1, OUT2 output terminal; P output P terminal; Q1, Q2, UP, UN, VP, VN, WP, WN semiconductor switching element; Vd power supply; Vin control signal terminal.

The invention claimed is:

1. A direct-current power supply, comprising:
a plurality of semiconductor devices each of which is a multiphase converter incorporating a plurality of semiconductor switching elements and a drive circuit configured to drive the plurality of semiconductor switching elements;
a plurality of first parasitic inductances, each of which connects a reference potential terminal of the drive circuit and an output N terminal of the semiconductor switching elements, in the plurality of semiconductor devices;
a smoothing capacitor;
an inverter; and
a P-side bus configured to connect an anode of the smoothing capacitor and the inverter, wherein
the plurality of the semiconductor devices include respective output P terminals connected to each other through a third jumper line, and
the output P terminal of one of the semiconductor devices is connected to the P-side bus through a fourth jumper line.

2. The direct-current power supply according to claim 1, wherein
in each of the plurality of semiconductor devices, the reference potential terminal of the drive circuit and the output N terminal of the semiconductor switching elements are connected to each other through a first jumper line, and
each of the first parasitic inductances is generated by the first jumper line.

3. The direct-current power supply according to claim 1, wherein
at least one of the plurality of semiconductor switching elements is a wide band gap semiconductor.

4. A refrigeration cycler, comprising the direct-current power supply according to claim 1.

5. An air conditioner, comprising the direct-current power supply according to claim 1.

6. A refrigerator, comprising the direct-current power supply according to claim 1.

7. The direct-current power supply according to claim 2, wherein
at least one of the plurality of semiconductor switching elements is a wide band gap semiconductor.

8. A refrigeration cycler, comprising the direct-current power supply according to claim 2.

9. A refrigeration cycler, comprising the direct-current power supply according to claim 3.

10. A refrigeration cycler, comprising the direct-current power supply according to claim 7.

11. An air conditioner, comprising the direct-current power supply according to claim 2.

12. An air conditioner, comprising the direct-current power supply according to claim 3.

13. An air conditioner, comprising the direct-current power supply according to claim 7.

14. A refrigerator, comprising the direct-current power supply according to claim 2.

15. A refrigerator, comprising the direct-current power supply according to claim 3.

16. A refrigerator, comprising the direct-current power supply according to claim 7.

* * * * *